Mar. 5, 1929.  M. W. ROMIG  1,703,960
SNAP LOCK FASTENER FOR NAME PLATES AND THE LIKE
Filed Nov. 6, 1925
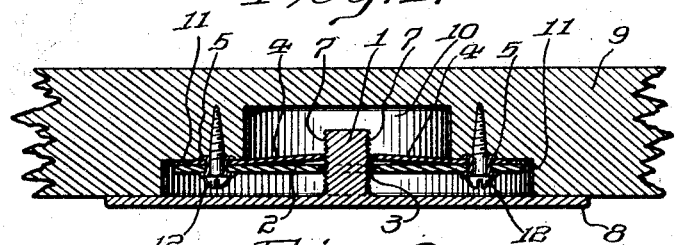
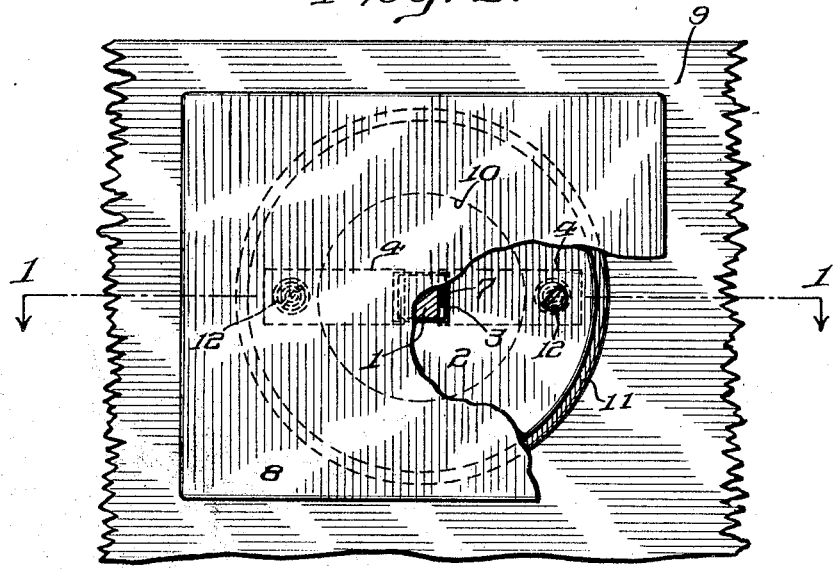
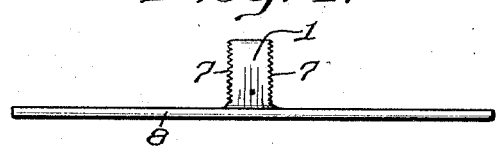
INVENTOR
Morris W. Romig.
BY John D. Myers
ATTORNEY
WITNESS
F. J. Hartman.

Patented Mar. 5, 1929.

1,703,960

UNITED STATES PATENT OFFICE.

MORRIS W. ROMIG, OF ALLENTOWN, PENNSYLVANIA, ASSIGNOR TO L. F. GRAMMES & SONS, INC., A CORPORATION OF MARYLAND.

SNAP-LOCK FASTENER FOR NAME PLATES AND THE LIKE.

Application filed November 6, 1925. Serial No. 67,385.

My invention relates to fastening means designed particularly for attaching manufacturers' name plates, tablets, escutcheons and the like to automobiles, pianos, furniture and similar articles.

According to common practice such plates are secured by screws or escutcheon pins passing therethrough, but that is objectionable because the fastening devices are exposed on the outer faces of the plates, thus detracting from the appearance thereof. Furthermore, the fastenings are susceptible of being readily removed, and hence do not provide a permanent attachment for the plates as is of course desirable in such instances.

The object of the present invention is to provide an improved snap lock fastener which is entirely concealed from view and provides a permanent means of attachment for a name plate, so that it cannot be removed without injury to the parts and serious defacement of the article to which it is applied.

A further object of the invention is to provide a device of this character which is simple and efficient in construction, and adapted to be conveniently applied, and which is composed of few parts, and may be easily and cheaply manufactured.

With these and other objects in view, the invention comprises the various novel features of construction and arrangement hereinafter set forth and illustrated in the accompanying drawing, in which—

Figure 1 is a sectional view, taken on the line 1—1 of Fig. 2, illustrating the use of my improved snap lock fastener in securing a plate to the base to which it is to be applied;

Fig. 2 is a front elevation thereof partly broken away;

Fig. 3 is an edge view, partly in section, of the keeper-plate; and

Fig. 4 is an edge view of the plate to be attached, showing the stud projecting rearwardly therefrom.

Similar numerals refer to similar parts throughout the several views.

My improved snap lock fastener comprises a stud 1 and a keeper-plate 2, the latter being formed in the central portion thereof with an opening 3 through which the stud is adapted to be inserted with its end projecting substantially perpendicularly beyond the inner or rear face of the keeper-plate. The stud is polygonal in cross section, and preferably square, and the opening 3 is of corresponding size and shape so as to prevent the stud from either turning or shifting laterally therein or having movement relatively to the keeper-plate, except longitudinally therethrough. On its inner or rear face the keeper-plate is provided with a pair of co-acting spring retaining members 4 which are in the form of leaf springs arranged in alinement, with their remote ends secured to the marginal portion of the keeper-plate by eyelets 5. Except at their outer ends the leaf springs are free and normally lie against the inner face of the keeper-plate, with their adjacent ends overlapping the opening 3 and projecting slightly beyond opposite side walls thereof. The free ends of these springs are preferably sharpened as indicated at 6 and are designed to engage with series of teeth or serrations 7 formed on opposite sides of the stud 1 and extending transversely thereof.

In the application of the invention the stud 1 is soldered or otherwise rigidly secured to a face-plate 8, such as for instance a manufacturer's name plate, and projects rearwardly at substantially right angles thereto. The base 9, to which the plate 8 is to be attached, is formed with a recess 10 of smaller size than the face-plate, but of suitable size to receive and entirely contain the keeper-plate 2. The recess is stepped or has its side walls offset to provide an outwardly facing shoulder 11 on which the marginal portion of the keeper-plate is seated and rigidly secured in position by means of screws 12 preferably passing through the eyelets 5. The keeper-plate is thus positioned across the recess in spaced relation to the inner or bottom wall thereof, as shown in Fig. 1. The stud 1 is then inserted in the opening 2 and is forced longitudinally therethrough to seat the face-plate 8 against the adjacent surface of the base 9. In its inner movement the stud abuts against the free ends of the retaining members and flexes them rearwardly away from the keeper-plate and presses them apart so as to pass therebetween. The free ends of the retaining members snap into engagement with the teeth or serrations 7 on opposite sides of the stud and ride over the same as the stud is thrust home. However, the retaining members positively and securely grip the stud to prevent any movement thereof in the opposite direction, and any effort to withdraw the stud merely causes the sharpened ends 6 thereof to bite into the shank and grip it more firmly. The face-plate 8 is thus securely attached to the base 9 and held in position in which it closes over and entirely covers the recess 10. The parts of the fastening device are housed within the recess 10 and completely concealed from view, and hence in no way detract from the appearance of the article. Furthermore, the fastening is permanent and the plate cannot be removed without breaking the fastener, in which instance the recess and keeper-plate therein are exposed to view and the article defaced, so that the removal of the plate cannot go unnoticed.

It will be understood that while a single snap lock fastener will be sufficient in many instances, any number of the same may be employed according to the size of the face-plate to be attached.

Various changes may be made in the details, form and arrangement of the parts within the scope of the invention, as defined in the appended claims.

Having thus described my invention, I claim and desire to protect by Letters Patent of the United States:

1. A fastening device of the character described comprising an attaching stud, a keeper-plate formed with an opening therethrough to receive the attaching stud, a pair of co-acting spring retaining members disposed on the rear face of the keeper-plate on opposite sides of said opening, said members having their adjacent members free and normally projecting inwardly toward each other and beyond the wall of said opening and adapted to grip the stud therebetween to prevent its withdrawal from said opening, and eyelets securing the respective members to the keeper-plate and also providing openings for fastening devices for securing the keeper-plate in position on a support.

2. A fastener of the character described comprising an attaching stud non-circular in cross-section, a keeper-plate formed with an opening therethrough to receive the attaching stud, said opening being non-circular and conforming substantially in size and shape to the size and cross-sectional shape of said stud and the wall of said opening fitting the stud to hold the same against turning movement therein and against any movement in the plane of the keeper-plate, a pair of co-acting spring retaining members disposed on the rear face of the keeper-plate on opposite sides of said opening, said members having their adjacent ends free and normally projecting inwardly towards each other beyond the wall of said opening and adapted to grip the stud therebetween to prevent its withdrawal from said opening, and eyelets securing the respective members to the keeper-plate and also providing openings for fastening devices for securing the keeper-plate in position on a support.

In testimony whereof, I have signed my name to this specification.

MORRIS W. ROMIG.